United States Patent
Filipovich

[11] 3,906,529
[45] Sept. 16, 1975

[54] ZOOM LENS MECHANISM
[75] Inventor: Danny Filipovich, Chicago, Ill.
[73] Assignee: Bell & Howell Company, Chicago, Ill.
[22] Filed: Sept. 10, 1973
[21] Appl. No.: 395,757

[52] U.S. Cl. ............................... 354/196; 350/187
[51] Int. Cl. ............................................. G03b 9/02
[58] Field of Search ............ 354/196, 270; 350/205, 350/206, 187; 352/140

[56] References Cited
UNITED STATES PATENTS

| | | | |
|---|---|---|---|
| 1,950,166 | 3/1934 | Deerholz | 354/196 |
| 3,122,079 | 2/1964 | Mahn | 354/196 X |
| 3,221,628 | 12/1965 | Mahn | 354/196 |
| 3,375,768 | 4/1968 | Klupsch | 354/196 |
| 3,633,483 | 1/1972 | Nagoshima | 354/196 |

*Primary Examiner*—Samuel S. Matthews
*Assistant Examiner*—E. M. O'Connor
*Attorney, Agent, or Firm*—John R. Hoffman; Louis A. Hecht; Roger M. Fitz-Gerald

[57] ABSTRACT

A zoom lens and diaphragm mounting barrel mechanism for mounting on a photographic camera. The mechanism generally includes a fixed lens barrel mountable on the camera and a movable barrel generally coaxially aligned with respect to the fixed barrel and mounted for rotation relative thereto. A zoom lens group is mounted coaxially within the lens barrel for axial movement relative thereto in response to rotation of the movable barrel. An adjustable diaphragm structure is disposed within the lens barrel in coaxial alignment with the zoom lens group and is capable of providing a plurality of aperture sizes. The diaphragm structure is mounted on the zoom lens group for axial movement therewith. The aperture size remains constant during axial movement of the diaphragm structure. The shutter and the diaphragm structure are interconnected for actuation of the diaphragm structure.

13 Claims, 4 Drawing Figures

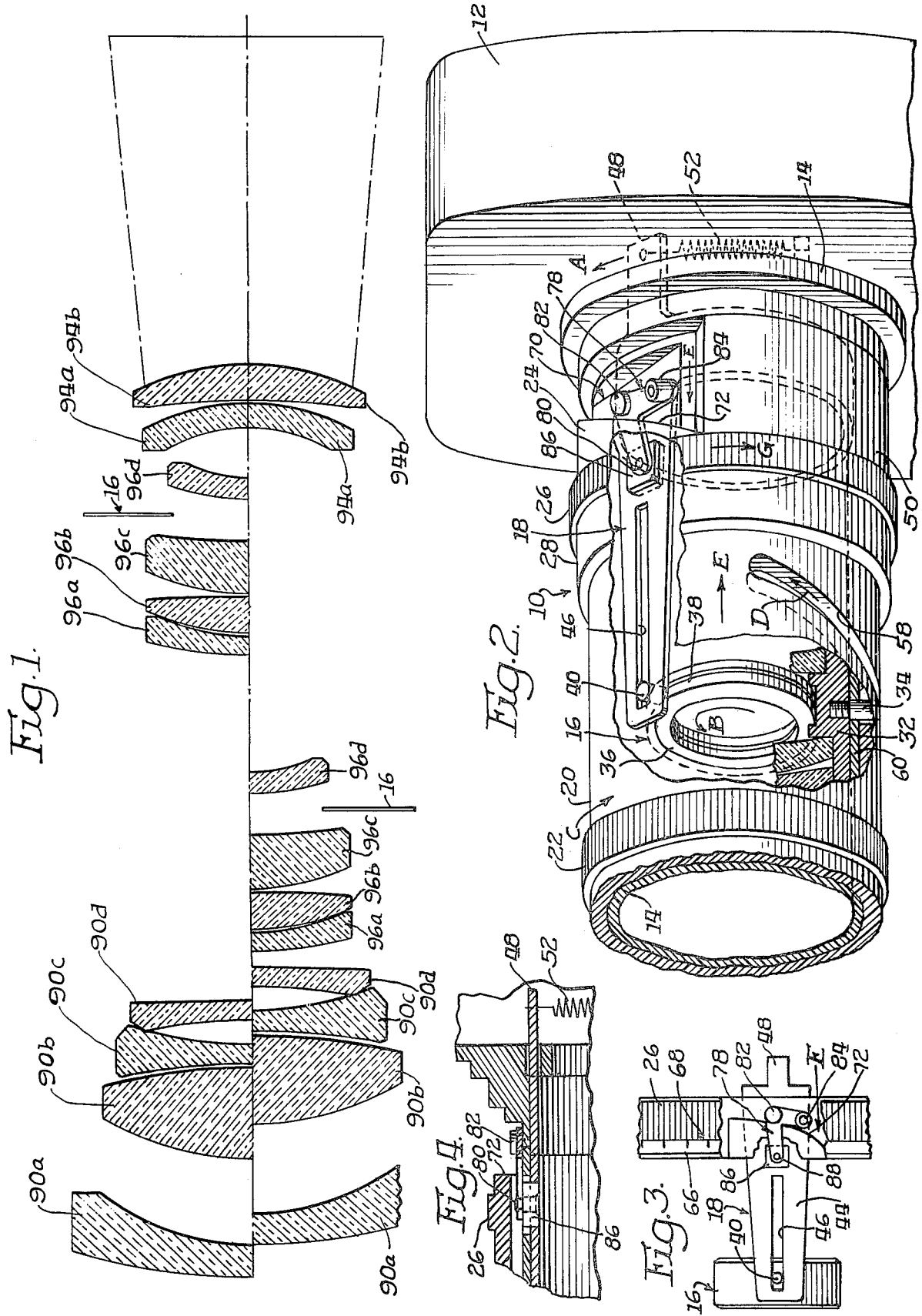

ZOOM LENS MECHANISM

BACKGROUND OF THE INVENTION

1. Field of the Invention

The present invention relates generally to photographic equipment and in particular to a zoom lens and diaphragm mounting barrel mechanism for mounting on a photographic camera.

2. Description of the Prior Art

Zoom lenses have enjoyed a great deal of popularity in recent times primarily because of its dual function as a telephoto lens and a wide angle lens. Except for fixed focal point type cameras, distance adjustment in ordinary cameras is accomplished by moving the lens longitudinally of the optical axis of the camera, and the diaphragm is usually supported in the lens barrel to insure proper exposure conditions.

In most zoom lens systems, the diaphragm, which is usually in the form of an iris, is fixed with respect to the zoom lens mounted within the lens barrel. Thus, known zoom lens systems for both still and movie cameras generally are designed to provide for a constant speed (f stop number) throughout their zoom range. In order to achieve such a constant speed, the lenses mounted within the lens barrel are designed with a fixed diameter stop placed anywhere behind the last moving component of the lens. The results of this construction lead to a considerable shift of the entrance pupil through the zoom range and result in the pupil being far removed from the front zoom element. This causes the need for a large diameter focusing front element which enlarges the entire zoom lens apparatus. This increases the cost of manufacture considerably.

SUMMARY OF THE INVENTION

The principal object of the present invention is to provide a new and improved zoom lens and diaphragm mounting barrel mechanism which is compact and relatively inexpensive to produce.

These and other objects of the present invention are accomplished by one embodiment currently contemplated which provides for a zoom lens and diaphragm mounting barrel mechanism which is mountable on a photographic camera with a shutter. The mechanism generally includes a fixed lens barrel mountable on the camera, a movable barrel coaxially aligned with the lens barrel and mounted for rotation relative to the lens barrel, a zoom lens group mounted coaxially within the lens barrel for axial movement relative thereto in response to the rotation of the lens barrel, an adjustable diaphragm structure disposed within the lens barrel in coaxial alignment with the zoom lens group for providing a plurality of aperture sizes, and a movable diaphragm actuating means operably connecting the shutter with the diaphragm structure for actuation of the diaphragm to form an aperture. The diaphragm structure is mounted on the zoom lens group for axial movement therewith. This provides a variable speed throughout the zoom lens range which is compensated for by changing the f stop by means of the movable diaphragm operating means.

BRIEF DESCRIPTION OF THE DRAWINGS

FIG. 1 is a side elevational schematic view of the lens components comprising the present zoom lens system in a wide angle position (top) and a telephoto position (bottom);

FIG. 2 is a perspective view, partially cut away and partially in section, of the mechanism of the present invention; and FIG. 3 is a partially cut away plan view of a portion of the mechanism of the present invention.

DESCRIPTION OF THE PREFERRED EMBODIMENT

Turning first to FIG. 2 in greater detail, the zoom lens and diaphragm mounting barrel mechanism, generally designated 10, is shown to be mounted on a camera housing 12. It is to be understood that the mechanism 10 of the present invention can be mounted on either a still camera or a movie camera.

The mechanism 10 generally includes a fixed interior lens barrel 14 wherein a plurality of lenses are mounted, a diaphragm structure, generally designated 16, mounted for axial movement within the lens barrel 14, and an actuation member, generally designated 18, for causing the diaphragm 16 to form an aperture in response to the actuation of the shutter mechanism of the camera. The mechanism 10 also includes a forward outside zoom barrel 20 coaxial and rotatable with respect to the lens barrel 14 and having a grip ring 22 formed thereon. A rear aperture barrel 24 is mounted on the lens barrel 14 for rotational movement relative thereto and having a grip ring 26 formed thereon. An intermediate ring 28 is formed on the fixed lens barrel 14. Rotation of the front zoom barrel 20 causes axial movement of the diaphragm structure 16, and rotation of the aperture barrel 24 effects the ultimate size of the aperture when the shutter mechanism is actuated.

The back of the mechanism 10 generally is a circular opening. The opening is at the front of the camera 12 when the mechanism is mounted thereon.

Turning now to the diaphragm structure 16 in greater detail, a conventional iris is employed to form the necessary aperture through which the image is directed. The iris, or diaphragm structure 16, is mounted on a frame 32 having a zoom drive pin 34 extending downwardly therefrom. The iris generally includes two rings 36 and 38. Ring 36 is fixed relative to frame 32 whereas ring 38 is rotatable with respect to ring 36 and frame 32. Ring 38 has a pin 40 extending radially therefrom and formed near the top thereof.

The actuation member 18 is seen to generally comprise a fork-shaped interior end 44 having a slot 46 formed therein. An exterior tab 48 extends through the back opening of the mechanism into engagement with the shutter mechanism at the front of camera 12. A collar portion 50 is disposed intermediate said fork-shaped end 44 and said tab end 48. The collar portion 50 is received in a complementary recess (not shown) formed in the interior of the lens barrel 14. When thus mounted, the actuation member is circumferentially rotatable within the lens barrel 14. However, the arc through which actuation member 18 is movable in a circumferential direction restricted by appropriate means in the camera 12.

Ring pin 40 is received within the actuation member slot 46. Slot 46 serves to guide the diaphragm structure 16 and frame 32 in a straight axial motion when moved, and also moves ring 38 in response to movement of actuation member 18.

Tab 48, which is operably connected to the camera shutter mechanism, is moved in a direction indicated by arrow A in FIG. 2. Actuation member 18 is biased in its initial position by means of a spring 52 mounted between the actuation member and the back of fixed barrel 14. When the actuation member 18 is thus moved, ring 38 is caused to rotate in a direction indicated by arrow B because of the interengagement of ring pin 40 within slot 46.

The rotation of ring 38 with respect to ring 36 causes blades (not shown) of the iris 16 to form an aperture. The greater the rotation of ring 38 with respect to ring 36, the greater the inward radial extension the blades and the smaller the aperture. Thus, iris 16 and ring 38 are movable between a normal fully open position wherein no blades are employed to form an aperture and a closed position wherein the blades are moved radially inwardly to form the smallest possible aperture. The shutter mechanism of camera 12 limits the movement of the actuation member 18 so that it cannot be moved a greater distance than would cause iris 16 to have no aperture whatsoever.

The diaphragm structure 16 and frame 32 are made to move axially within the lens barrel 14 by means of a zoom cam slot 58 formed in the zoom barrel 20. Zoom drive pin 34 is received within slot 58 and is capable of traversing the slot when barrel 20 is rotated. An appropriate opening 60 is provided in the lens barrel 14 to allow pin 34 to be received and move within slot 58.

Looking at FIG. 2, when zoom barrel 20 is rotated in the direction indicated by arrow C, pin 34 travels in slot 58 in the direction indicated by arrow D. This causes iris pin 40 to travel axially within slot 46 and the diaphragm structure 16 and frame 32 to move in the direction indicated by arrow E. If the zoom barrel 20 is rotated in the direction opposite from that of arrow C, the diaphragm structure 16 and frame 32 are made to move in a direction opposite that of arrow E.

Because the diaphragm structure 16 is not axially fixed there is no constant $f$ stop. Accordingly, means must be provided to adjust the aperture opening depending on where the aperture or diaphragm structure 16 is located within the lens barrel 14. This can be accomplished by restricting the movement of actuation member 18. That is, the less movement of actuation member 18 in the direction indicated by arrow A, the larger the aperture opening in the diaphragm structure 16. To this end, there is provided $f$ stop indicia 66 (FIG. 3) on the fixed ring 28, alignable indicia in the form of a dot 68 printed on barrel 24 adjacent the $f$ stop indicia 66, and a cam slot 70 formed in the aperture barrel 24 and having a cam surface 72 defined thereon. The cam slot 70 is of a non-constant width so that cam surface 72 will be closer or farther away from a given stationary point as barrel 24 is rotated. An L-shaped member, generally designated 78, is operably connected between the actuation member 18 for engagement with cam surface 72. More particularly, the L-shaped member 78 has the end of one leg pinned at 80 to the actuation member 18, the juncture of the two lens pinned at 82 to a shelf (not shown) extending between the L-shaped member 78 and the actuation member 18, and a cam follower on the end 84 of the other leg. A spacer block 86 is provided on top of the actuation member 18 through which the end of one leg is pinned at 80 in order to space the L-shaped member 78 from the actuation member.

Looking at FIGS. 2 and 3, when actuation member 18 is moved in the direction indicated by arrow A by the camera shutter mechanism, the cam follower end 84 will be pivoted in the direction indicated by arrow E into abutting engagement with cam surface 72. When the cam follower end 84 abuts cam surface 72, the movement of actuation member 18 will stop. This will limit the rotation of ring 38 which will determine the aperture size of the iris 16.

When aperture barrel 24 is rotated in a direction indicated by arrow G in FIG. 2, it can be seen that cam surface 72 will be closer to the cam follower end 84 of the L-shaped member 78. When aperture barrel 24 is rotated in a direction opposite that of arrow G in FIG. 2, the cam follower end 84 will be proportionately further away from cam surface 72. The further away the cam follower end 84 is from the cam surface 72, the greater the movement in the direction indicated by arrow A of actuation member 18, which means the smaller the aperture in iris 16. In this manner, the f stop setting of the mechanism 10 can be adjusted according to the relative axial location with respect to the fixed lens barrel 14.

Turning now to FIG. 1 in greater detail, a lens configuration which can be used in the mechanism 10 already described is illustrated. The half lenses when relatively disposed as appearing above lines A—A show the configuration of the mechanism 10 when in a wide angle position. The relative disposition of the lenses below line A—A show the mechanism when it is in a telephoto position.

Like most zoom lens systems, FIG. 1 shows a movable focus lens group, 90a, 90b, 90c and 90d, a stationary relay lens group 94a and 94b and a movable zoom lens group 96a, 96b, 96c and 96d. The zoom lens group 96a, 96b, 96c and 96d is mounted on the same frame 12 with the diaphragm structure 16. Thus, the zoom lens group are movable axially in response to the rotation of zoom barrel 20.

For the mechanism to be in the position shown at the top of FIG. 1, barrel 20 must be rotated as far as possible in the direction indicated by arrow C. To be in the position shown at the bottom of FIG. 1, the barrel 20 must be rotated as far as possible in a direction opposite that of arrow C. Of course, there are an infinite number of positions between those illustrated in FIG. 1.

The foregoing detailed description has been given for clearness of understanding only and no unnecessary limitations should be understood therefrom as some modifications will be obvious to those skilled in the art.

I claim:

1. A zoom lens and diaphragm mounting barrel mechanism comprising:

a fixed lens barrel having a longitudinal axis mountable on a photographic camera with a shutter mechanism;

a movable barrel coaxially aligned with said fixed barrel and mounted for rotation relative thereto;

a zoom lens group including at least one lens mounted coaxially within said lens barrel for axial movement relative thereto in response to rotation of said movable barrel;

an adjustable diaphragm structure disposed within the lens barrel in coaxial alignment with said zoom lens group and being capable of providing a plurality of aperture sizes, said diaphragm structure including an iris mounted on said zoom lens group for axial movement therewith, said iris having a constant aperture during said axial movement; and movable diaphragm operating means operably connecting said shutter mechanism for actuating said iris to form a desired aperture.

2. The mechanism of claim 1 wherein said iris has a first ring and a second ring rotatable with respect to the first ring for adjusting the size of the aperture, said diaphragm operating means is operably connected to said second ring and is capable of movement in response to actuation of the shutter between an open position wherein said aperture is at its greatest size and a closed position wherein said aperture is at its smallest size.

3. The mechanism of claim 2 including aperture size control means associated with the diaphragm operating means for selectively restricting the movement of said diaphragm operating means whereby the size of the aperture is controlled.

4. A zoom lens and diaphragm mounting barrel mechanism comprising:
- a fixed lens barrel having a longitudinal axis mountable on a photographic camera with a shutter mechanism;
- a movable barrel coaxially aligned with said fixed barrel and mounted for rotation relative thereto;
- a zoom lens group including at least one lens mounted coaxially with said lens barrel for axial movement relative thereto in response to rotation of said movable barrel;
- an adjustable diaphragm structure disposed within the lens barrel in coaxial alignment with said zoom lens group and being capable of providing a plurality of aperture sizes, said structure including an iris mounted on said zoom lens group for axial movement therewith, said iris having a constant aperture during said axial movement and having a first ring and a second ring rotatable with respect to the first ring for adjusting the size of the aperture, said second ring being rotatably movable between an open position wherein the aperture is at its greatest size and the closed position wherein the aperture is at its smallest size;
- movable diaphragm operating means operably connecting said shutter mechanism for rotating said second ring between said open and closed position; and
- aperture size control means associated with the diaphragm operating means for selectively restricting the movement of said diaphragm operating means whereby the rotation of the second ring and the size of a desired aperture is controlled.

5. The mechanism of claim 4 wherein said zoon lens group includes a zoom index drive pin extending radially outwardly therefrom, said lens barrel includes a helical slot formed therein for receiving said zoom index drive pin and defining a cam surface for said pin, the second ring of said iris has an iris pin extending radially outwardly therefrom, and said diaphragm operating means includes an axial guide slot for receiving said iris pin therein, whereby the zoom lens group is moved axially within the lens barrel without rotation in response to rotation of the lens barrel.

6. The mechanism of claim 5 wherein said diaphragm operating means includes a fork-shaped actuation member extending longitudinally of said axis, said fork-shaped member having an end within the lens barrel defining said axial guide slot and an exterior operably connected to the shutter, said actuation member being mounted for movement in an arcuate path extending generally circumferentially of the axis of said fixed lens barrel, said actuation member being movable in response to the shutter between a normally non-actuated position wherein said second ring is in an open position and an actuated position wherein the second ring has been rotated an amount allowed by said aperture size control means.

7. The mechanism of claim 6 wherein said aperture size control means includes a cam surface mounted on said lens barrel for rotation relative thereto and stop means mounted on said actuation member having a cam follower portion adapted to contact said cam surface whenever said actuation member is in an actuation position, whereby the movement of said actuation member is stoped after actuation whenever said cam follower portion abuts said cam surface.

8. A zoom lens and diaphragm mounting barrel mechanism comprising:
- a fixed lens barrel having a longitudinal axis mountable on a photographic camera with a shutter;
- a movable zoom barrel coaxially aligned with said fixed barrel and mounted for rotation relative thereto, said zoom barrel having a cam slot formed therein;
- a zoom lens group including an axially movable frame mounting at least one lens thereon coaxially with the lens barrel, said frame having a pin mounted thereon which is received in the zoom barrel cam slot so that said frame will be axially moved in response to rotation of said zoom barrel;
- an adjustable diaphragm structure disposed within the lens barrel in coaxial alignment with said zoom lens group and being capable of providing a plurality of aperture sizes, said structure including an iris mounted on said zoom lens group frame for axial movement therewith, said iris having a constant aperture during said axial movement and having a first ring and a second ring rotatable with respect to the first ring for adjusting the size of the aperture, said second ring having a pin secured thereto and rotatable between normally open position wherein said aperture is at its greatest size and a closed position wherein said aperture is at its smallest size;
- an actuation member extending longitudinally of said axis and having a fork-shaped end with an axial guide slot within which the ring pin is captured and an exterior end operably connected to said shutter, said actuation member being movable in an arcuate path extending generally circumferentially of the axis of said fixed lens barrel between a normally non-actuated position wherein the second ring is in an open position and an actuated position wherein the second ring has been rotated; and
- aperture size control means associated with the actuation member for selectively restricting the movement of said actuation member, said aperture size control means including a second movable barrel coaxially aligned with said fixed barrel and mounted for rotation relative thereto, said second movable barrel having a slot formed therein defining a cam surface, and stop means operably associated between said actuation member and said cam surface and having a cam follower portion adapted to contact said cam surface whenever said actuation member is in an actuation position, whereby the movement of said actuation member after actuation thereof is stopped whenever said cam follower portion abuts said cam surface.

9. The mechanism of claim 8 wherein said actuation member is biased toward its non-actuated position.

10. The mechanism of claim 8 wherein said stop means includes an L-shaped member having a portion thereof pivotally mounted to said actuation member and having another portion thereof pivotally mounted to the interior of the lens barrel and having another portion thereof defining said cam follower.

11. A zoom lens and diaphragm mounting barrel mechanism comprising:
   a fixed lens barrel having a longitudinal axis mountable on a photographic camera having a shutter mechanism;
   a movable barrel coaxially aligned with said fixed barrel and mounted for rotation relative thereto;
   an adjustable, axially movable diaphragm structure disposed within the lens barrel in coaxial relationship with said barrels and capable of providing a plurality of aperture sizes, said structure including an iris having a constant aperture during said axial movement; and
   a diaphragm operating means operably connecting said shutter mechanism for operating the diaphragm to form a desired aperture.

12. The mechanism of claim 11 including a zoom lens group having at least one lens mounted coaxially with said lens barrel for axial movement relative thereto in response to the rotation of said movable barrel.

13. The mechanism of claim 12 including a zoom frame mounted for axial movement in response to the rotation of said movable barrel, said zoom lens group and said diaphragm structure being fixedly mounted on said frame.

* * * * *